April 7, 1931.   B. A. SLOCUM ET AL   1,799,184
PHOTOGRAPHIC PACKAGE
Filed April 8, 1927

INVENTORS
BENJAMIN A. SLOCUM,
JOHN F. POLHEMUS
BY
ATTORNEY

Patented Apr. 7, 1931

1,799,184

UNITED STATES PATENT OFFICE

BENJAMIN A. SLOCUM, OF BINGHAMTON, AND JOHN F. POLHEMUS, OF JOHNSON CITY, NEW YORK, ASSIGNORS, BY MESNE ASSIGNMENTS, TO AGFA ANSCO CORPORATION, OF BINGHAMTON, NEW YORK, A CORPORATION OF NEW YORK

PHOTOGRAPHIC PACKAGE

Application filed April 8, 1927. Serial No. 182,099.

Our invention relates to packages or cartridges for photographic film and particularly to that type wherein a strip of film is coiled within a hollow box or casing and adapted to be withdrawn therefrom step by step through a camera and coiled within a similar box within the camera.

One object of our invention is to provide a novel film guide within the box which greatly facilitates the coiling of the film therein.

Another object lies in the provision of a novel end piece for the film box which serves the twofold purpose of a light lock and a means for securing the film locked in position.

Still another object is to provide a novel non-metallic receptacle for the film, the inner wall of which is of a shape to conform to the coil of film therein and the outer sides of which lie in angular planes with reference to each other.

A still further object is to provide a film guide with means for facilitating the insertion of film in the receptacle and preventing its binding upon withdrawal.

Other objects and advantages in details of construction will be apparent as the description proceeds, reference now being had to the figures of the drawing wherein like reference numerals indicate like parts.

In the drawing:—

Figure 1:
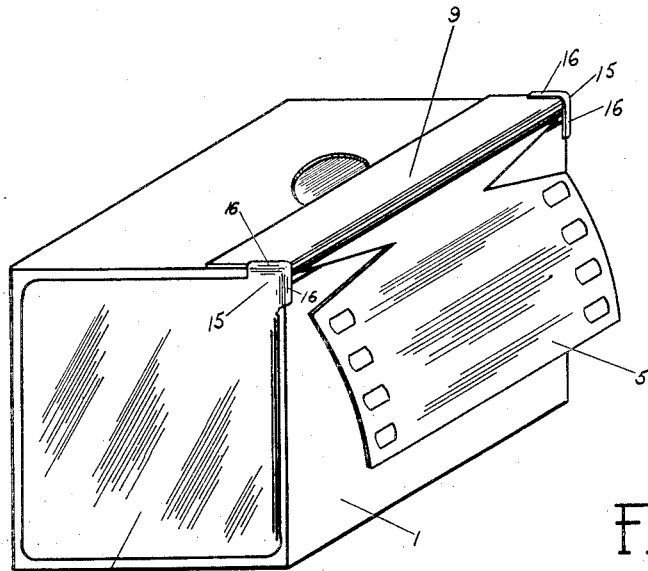
Figure 1 is a detail perspective view of our improved film package.
Figure 2:
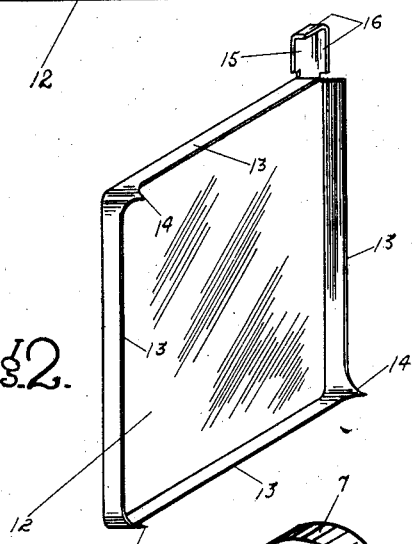
Figure 2 is a detail perspective view of our improved end pieces for such package.

The reference numeral 1 refers to the non-metallic box or casing provided inside with a hollow compartment 2 having its wall curved as shown within which the film 3 is adapted to be coiled. The box is preferably of wood although fiber or other non-metallic material may be used. Metal is avoided purposely for this use due to the weight, bulk, likelihood of becoming bent, and propensities for scratching the film. An opening 4 is provided adjacent one corner of the box through which the end 5 of the film strip projects for facilitating the threading of the film through the camera and through which the film itself is drawn or inserted. The outer walls of the box are preferably straight, flat sided and angular with respect to each other, whereby the box may be placed in the camera compartment and held against tilting.

A strip of velvet or other suitable material 6 is secured within the opening 4 directly to the surface of the box through which such opening extends whereby to prevent the scratching of the film and also to prevent the entrance of light through said opening into the interior compartment 2 where the film is coiled.

Figure 3:
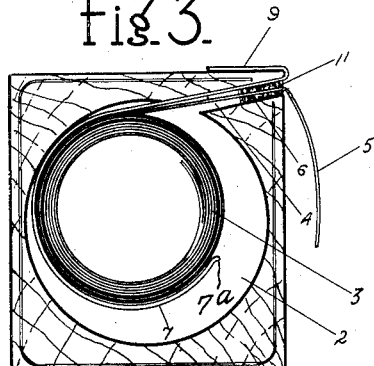
Figure 3 is a detail cross sectional view of our improved package.
Figure 4:
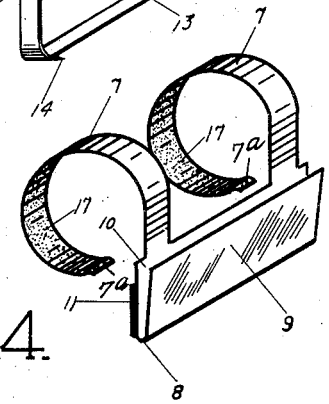
Figure 4 is a detail perspective view of the film guide.
Figure 5:
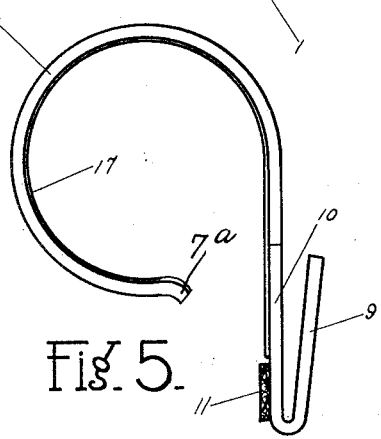
Figure 5 is an enlarged end view thereof.

A film guide is provided consisting of the spring fingers 7 substantially circular in shape formed of flexible material which will expand with the coiling of the film therein as clearly shown in Figure 3 to conform to the shape of the inner wall of the receptacle. The spring fingers 7 are preferably integral at one end with a flat strip of suitable material folded upon itself as at 8 and the upper flange or flap 9 of which extends along the top edge of the box 1, and the lower flap or flange 10 of which lies within the opening 4 and carries on its underside a strip 11 of velvet or other suitable material similar to a strip 6 and directly opposite thereto. Between these strips, the film 3 passes.

The opposite or free ends of the spring fingers 7 are formed with outwardly turned lips 7a whereby to facilitate the coiling of the film upon itself as it is fed into said film guide and at the same time prevent binding of the coil of film when the same is unwound upon withdrawal.

It should be stated here that due to the curved inner wall of the receptacle, a natural guide for the coiling of the film upon itself is formed. The spring guide however tends to greatly facilitate and improve the coiling and is preferably used with my invention.

End pieces 12 are provided for the box comprising flat plates provided with flanges 13, three of the corners of which are preferably pointed and sharpened as at 14, whereby the end pieces may be driven into the wooden ends of the box 1.

One corner of the end pieces 12 is provided with an extended ear 15, flanged as at 16 for the double purpose of covering the ends of the opening 4, thereby preventing light entering the box through such ends and engaging over the top flap or flange 9 of the film guide whereby to securely hold the same in position.

The inner surface of the spring fingers 7 preferably provided with a coating 17 of wax or other suitable material adapted to reduce the friction of the film or said spring fingers and to prevent the scratching thereof.

We do not limit ourselves to the exact form shown and described other than by the appended claims.

We claim:—

1. A photographic film package comprising a receptacle adapted to receive a coil of film, an opening in said receptacle to permit the insertion and withdrawal of said film, a spring film guide in said receptacle having a portion extending through said opening and engaging an outer wall of said receptacle, means in said opening for preventing the passage of light into said receptacle therethrough, end pieces on said receptacle provided with means for closing the ends of said opening and securing said extending portion of said film guide to said receptacle.

2. A photographic film package comprising a receptacle adapted to receive a coil of film, an opening in said receptacle to permit the insertion and withdrawal of said film, a film guide in said receptacle having a portion extending through said opening and engaging an outer wall of said receptacle, means in said receptacle for preventing the passage of light into said receptacle therethrough, flanged end pieces on said receptacle, certain corners of said end pieces being extended to close the ends of said opening and secure said extending portion of said film guide to said receptacle.

3. A photographic film package comprising a receptacle adapted to receive a coil of film an opening in said receptacle to permit the insertion and withdrawal of said film, a film guide in said receptacle having a portion extending through said opening, and means on said extending portion and on one wall of said opening for preventing light entering said receptacle therethrough.

4. A film cartridge provided with an opening for the insertion and withdrawal of film, a film guide in said cartridge whereby said film coils upon itself during said insertion, the free end of said guide having an outwardly turned lip whereby to facilitate the coiling of said film during insertion and prevent the binding thereof during withdrawal.

BENJAMIN A. SLOCUM.
JOHN F. POLHEMUS.